United States Patent [19]
Brady

[11] Patent Number: 5,892,838
[45] Date of Patent: Apr. 6, 1999

[54] BIOMETRIC RECOGNITION USING A CLASSIFICATION NEURAL NETWORK

[75] Inventor: Mark J. Brady, Cottage Grove, Minn.

[73] Assignee: Minnesota Mining and Manufacturing Company, St. Paul, Minn.

[21] Appl. No.: 664,215

[22] Filed: Jun. 11, 1996

[51] Int. Cl.$^6$ .............................. G06K 9/46; G06K 9/62
[52] U.S. Cl. ......................... 382/115; 382/124; 382/156; 382/190; 382/218; 382/278
[58] Field of Search ................................. 382/224, 124, 382/125, 209, 218, 115, 190, 156, 159, 157, 278

[56] References Cited

U.S. PATENT DOCUMENTS

| | | | |
|---|---|---|---|
| 4,151,512 | 4/1979 | Riganati et al. | 382/125 |
| 4,857,916 | 8/1989 | Bellin | 340/825.34 |
| 4,896,363 | 1/1990 | Taylor et al. | 382/125 |
| 4,993,068 | 2/1991 | Piosenka et al. | 380/23 |
| 5,067,162 | 11/1991 | Driscoll, Jr. et al. | 382/126 |
| 5,103,486 | 4/1992 | Grippi | 382/116 |
| 5,161,204 | 11/1992 | Hutcheson et al. | 382/157 |
| 5,163,094 | 11/1992 | Prokoski et al. | 382/118 |
| 5,202,929 | 4/1993 | Lemelson | 382/116 |
| 5,229,764 | 7/1993 | Matchett et al. | 340/825.34 |
| 5,258,924 | 11/1993 | Call et al. | 382/103 |
| 5,291,560 | 3/1994 | Daugman | 382/117 |
| 5,450,504 | 9/1995 | Calia | 382/118 |
| 5,572,597 | 11/1996 | Chang et al. | 382/125 |

FOREIGN PATENT DOCUMENTS

| | | | |
|---|---|---|---|
| 0 308 162 A2 | 3/1989 | European Pat. Off. | A61B 5/10 |
| 8503290 | 6/1987 | Netherlands | G07C 9/00 |
| WO 90/08366 | 7/1990 | WIPO | G07C 9/00 |

OTHER PUBLICATIONS

Nadler et al. *Pattern Recognition Engineering*, John Wiley & Sons Inc. pp. 281–294, 1993.

"Classification of Fingerprint Images a Neural Network", by Masayoshi Kamijo, *Systems and Computers in Japan*, vol. 23, No. 3, 1992, pp. 89–101.

"Automatic Fingerprint Identification", by K. Asai et al., 11552 Imaging Applications for Automated Industrial Inspection & Assembly SPIE 182(1979), Apr. 19–20, 1979, Washington, D.C.

Walter, Scott R., Fingerprint Mechanics, A Handbook, Finderprints from Crime Scene to Courtroom, 1st Ed., Thomas [c1951] XXII.

"Thumb Scan Proposal", 3M Proposal No. IE6871.316–RES–88, Jun. 1988.

"Adream", 3M Proposal No. CR6871.461–RES–89, Revised Feb. 1990.

"Adream" Task IV, Nov. 1991.

(List continued on next page.)

*Primary Examiner*—Jon Chang
*Attorney, Agent, or Firm*—Gary L. Griswold; John H. Hornickel

[57] ABSTRACT

A biometric recognition system involves two phases: creation of a master pattern set of authorized users biometric indicia and authentication using a classification neural network. To create the master pattern set, an image of an authorized biometric user's indicia is divided into a plurality of regions of interest or "features". The system determines which features are the most useful for identification purposes. Master patterns are then created from these master features, thus creating a master pattern set. During authentication, a sample pattern set of a user to be authenticated is similarly created. A neural network is used to compare the sample pattern set with the master pattern set to determine whether the user should be authenticated.

23 Claims, 7 Drawing Sheets

OTHER PUBLICATIONS

Identix Inc. Brochure, "TouchPrint™", 1993.
Identix Inc. Brochure, "TouchSafe™ Data Access Control", 1993.
Identix Inc. Brochure, "TouchLock™ Physical Access Control", 1993.
Identix Inc. Brochure, "TouchView™".
Conference Brochure, "Strategies for the Millennium", Apr. 10–13, 1995.
Burnell, "A defaced face can't beat the heat", *Automatic ID News*, Jul. 1995.
Recognition Systems, Inc. Brochure, ID3D HandKey™, Hand Identity Verifier.
Ashbaugh, David R., *Ridgeology*, "Modern Evaluative Friction Ridge Identification", Canada.

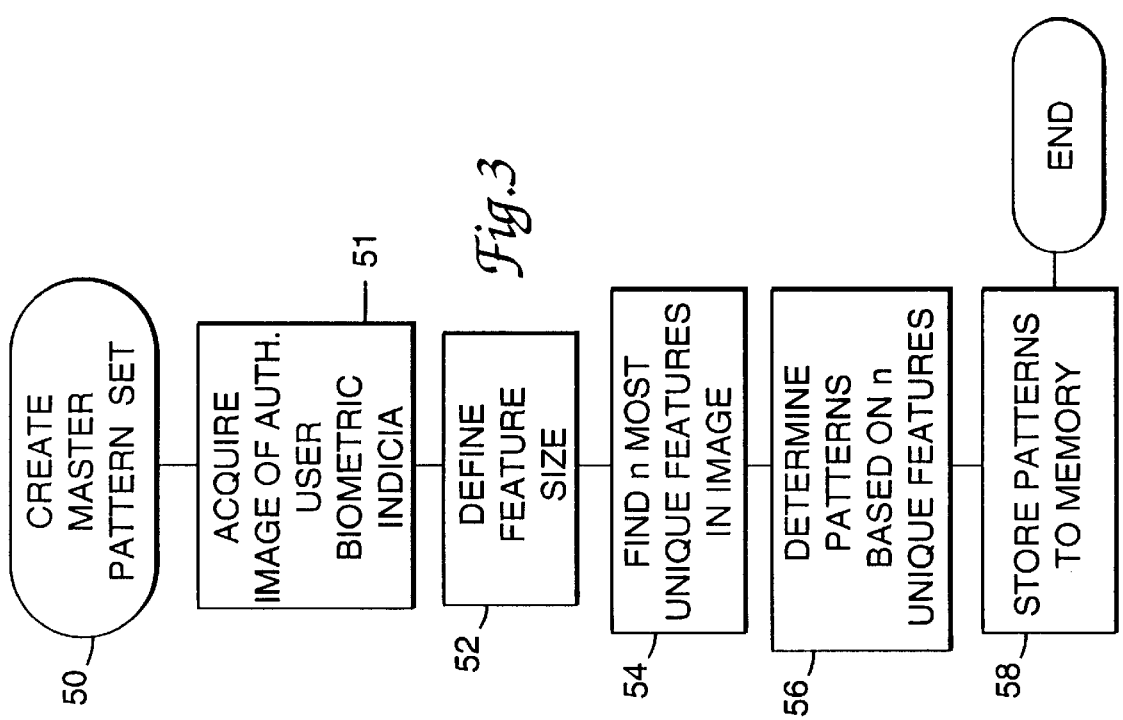
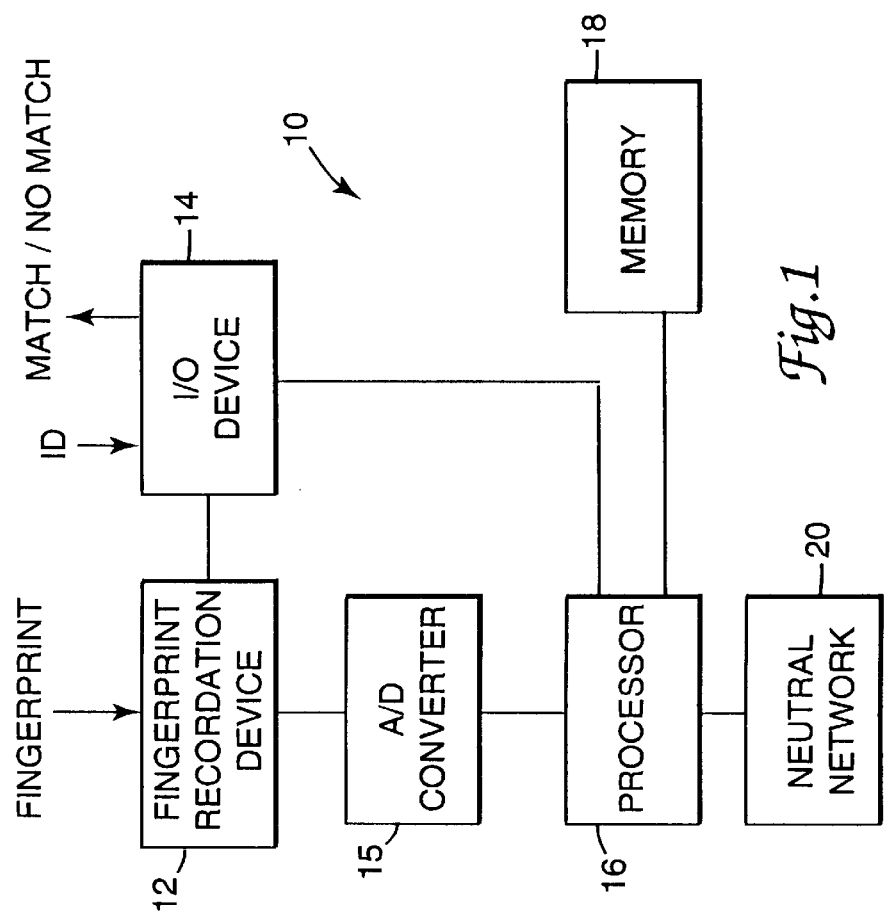

BIOMETRIC RECOGNITION USING A CLASSIFICATION NEURAL NETWORK

GOVERNMENT RIGHTS

This invention was made with Government support under Loral Subcontract SO-124465-S and MDA904-93-C4074. The Government has certain rights in this invention.

FIELD OF THE INVENTION

The present invention generally relates to the field of image matching. More particularly, it relates to biometric, personal authentication systems that authenticate identities of individuals.

BACKGROUND OF THE INVENTION

Although the present invention can be applied generally in the field of image matching, the invention has particular utility in the area of personal identification. Identification of an individual or verifying whether an individual is the person he claims to be is a common problem faced by individuals, businesses, and governments. While sophisticated personal identification is often used for security in sensitive government and commercial installations, matching for personal identification has potential application wherever a person's identity needs to be identified or verified, such as in the control of access to physical locations, such as airports, industrial locations and in the home. It also has potential application in the control of access to computing and data management equipment and in banking or commercial transactions.

Methods for identification of an individual often include reliance upon knowledge of restricted information, such as a password, possession of a restricted article, such as a passkey, or physical appearance, such as matching a reference photo. Biometric indicia have also been used for personal identification. Biometrics is the study of biological phenomena, and in the area of personal identification, some chosen characteristic of a person is used to identify or verify that person's identity. Biometric identification is particularly useful because certain personal characteristics are substantially unique to each person and are difficult to reproduce by an impostor. Further, the recording and analysis of biometric data can be automated, thereby allowing use of computer controlled electronics and digital recording techniques.

The use of biometric indicia for identification purposes requires that a particular biometric factor is substantially unique for each individual, that it is readily measured and that it is invariant over the time period during which the person may be tested for identification. Further, the biometric indicia should be difficult to duplicate by an impostor in order to secure against erroneous identification. The biometric indicia may be biologically determined or it may be some characteristic that is learned or acquired, such as handwriting or voice patterns.

Some of the biometric characteristics most investigated today for use in a personal identification system include fingerprints, hand or palm prints, retina scans, signatures and voice patterns. Hand or palm print techniques typically evaluate the shape of a person's hand or other significant features such as creases in the palm, but these techniques may be fooled by templates or models of the hand of an authorized person. Retina scanning techniques evaluate the pattern of blood vessels in a person's retina. A drawback of this technique is that the blood vessel pattern may vary over time, such as when alcohol is in the blood stream or during irregular use of glasses or contact lenses. Also, a user may feel uneasy about having his or her eye illuminated for retina scanning or the possibility of eye contamination if there is contact between the eye and the scanning apparatus. Signatures may be easily forged and must usually be evaluated by a human operator, although research has been done on automated systems that evaluate the dynamics of a person's handwriting, such as the speed and the force of hand movement and pauses in writing. Using voice patterns as the identifying characteristic encounters difficulties owing to the wide variations in a person's voice over time, the presence of background noise during an evaluation and the potential for an impostor to fool the system with a recording of the voice of an authorized person.

Although many biologically determined indicia have been used over the years, such as the human eye, facial features, bone structure, fingernail pattern and creases in the palm or fingers of the hand, fingerprints have been the most commonly used biometric characteristic for personal identification. The technology of personal identification through fingerprint analysis has long been used in law enforcement. This long term experience with fingerprint analysis has developed a large amount of information about fingerprints and has confirmed the uniqueness of a person's fingerprints. Historically, in law enforcement, fingerprints have been recorded by inking the fingerprint and making a print on a card for storage. Particularly for applications outside of law enforcement, less burdensome and intrusive recording methods needed to be developed.

Various electro-mechanical systems for recording and matching a live fingerprint with a stored representation of the fingerprint of the authorized person have been developed. In one type of system, an image of the live fingerprint pattern is read and optically compared with a master fingerprint that was stored on film. Difficulties arise in this system in aligning the live and the master fingerprint patterns, leading to the use of complicated devices to secure the user's finger in exact alignment with the recording device or to rotate and translate the live pattern with respect to the stored pattern to perform the registration. Further, because this type of system relies on a precise one-to-one sizing of the live and stored fingerprint patterns, errors in matching can occur where the live fingerprint pattern is deformed even slightly, such as when the finger is swollen or is pressed hard against the reading surface.

In another type of fingerprint matching system, the live fingerprint is read and the image is compared with a hologram of the fingerprint of the authorized person. This system requires the storage of a library of holograms at the testing location for each authorized person in the system and the use of a specialized light source and a complicated optics system.

The trend in automatic fingerprint matching is toward the increased use of electronics and computer control of the matching process, while minimizing the reliance on moving mechanical parts and complicated optics systems. In such a system, the live fingerprint typically is scanned and digitally recorded as a binary image of the fingerprint pattern. Characteristic features of the fingerprint pattern, such as ridge endings, points of ridge bifurcation and the core of a whorl, each defining a feature of the fingerprint pattern, are found in the binary fingerprint image. The binary fingerprint image is compared with a stored master pattern that has been derived previously from a fingerprint of the authorized person in order to determine whether there is a match. Many systems that attempt to identify features in the fingerprint pattern such as forks or ridge endings must make decisions of matching early in the comparison process. If any errors are made early in the decision making process, such errors propagate through the remainder of the decision making process, thereby increasing the chance of error. Also, many systems have preconceived notions of what features should be recognized in the fingerprint image. For example, based on human studies of the fingerprint, certain categories of fingerprints have been identified and features in fingerprints named. Identifying such predetermined features and phenomena has been integral in most fingerprint identification systems.

In the simplest of fingerprint matching systems, the features of both the live and the master fingerprints are compared and a correlation function is applied to the comparison. A significant disadvantage of this type of system is that the user's finger typically is required to be in exact alignment with the image recording device so that the coordinate system of the binary image derived from the live fingerprint pattern is in the same orientation and position as the coordinate system on which the master fingerprint pattern. Further, as human skin is elastic, how the skin of the finger interacts with the platen of the image recording device also can change the recorded live fingerprint. For example, elastic deformations or distortions of the recorded fingerprint due to the elastic nature of skin may be recorded, or oil on the skin may cause the platen to record wider ridges. Such variables often defeat the accuracy of systems that rely on correlation functions.

SUMMARY OF THE INVENTION

A biometric recognition system involves two phases: creation of a master pattern set of authorized users biometric indicia and authentication using a classification neural network. To create the master pattern set, an image of an authorized biometric user's indicia is divided into a plurality of regions of interest or "features". The system determines which features are the most useful for identification purposes. Master patterns are then created from these master features, thus creating a master pattern set. During authentication, a sample pattern set of a user to be authenticated is similarly created. A neural network is used to compare the sample pattern set with the master pattern set to determine whether the user should be authenticated.

BRIEF DESCRIPTION OF THE DRAWINGS

The present invention will be more fully described with reference to the accompanying drawings wherein like reference numerals identify corresponding components, and:

FIG. 1 is a block diagram of a system for biometric recognition according to the present invention;

FIG. 3 is a flow diagram of a method for enrolling a user's biometric feature and storing it to memory as a master pattern;

DETAILED DESCRIPTION OF A PREFERRED EMBODIMENT

Figure 2A:
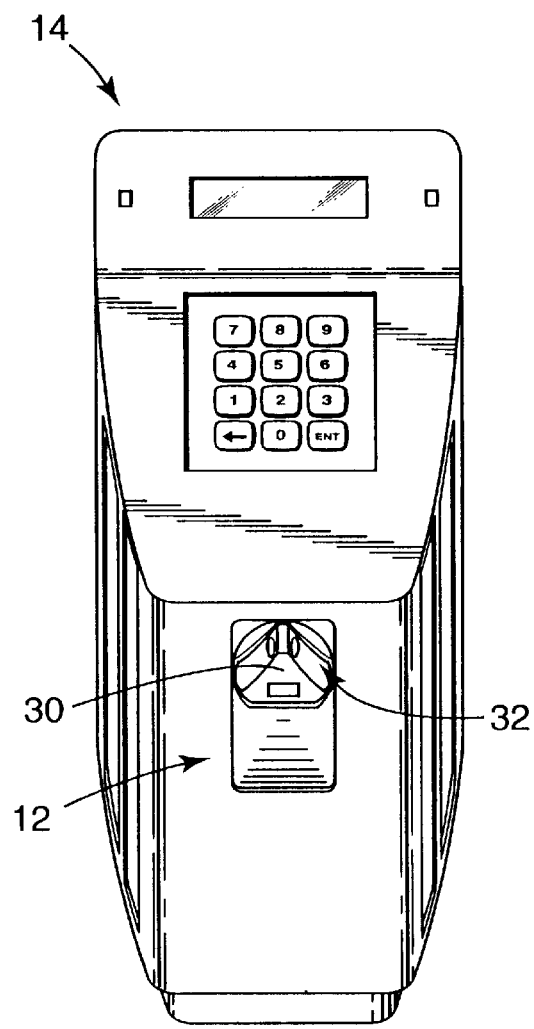
FIG. 2a and 2b are a front perspective view and a top view, respectively, of an input/output and fingerprint recordation device.

In the following detailed description of the preferred embodiment, reference is made to the accompanying drawings which form a part hereof, in which is shown by way of illustration a specific embodiment of which the invention may be practiced. It is to be understood that other embodiments may be utilized and structural changes may be made without departing from the scope of the present invention.

The biometric recognition system of the present invention can be broken down into two phases. The first phase is creation of a set of master patterns, called the master pattern set, of an authorized user's biometric indicia. In the second phase, authentication, an image of the biometric indicia of a user to be authenticated, is obtained. Authentication requires a match between the user's presented live biometric pattern and a recorded master pattern set. In the following detailed description of a preferred embodiment, a biometric recognition system for recognizing fingerprints will be described. However, those skilled in the art will readily recognize that with insubstantial changes, the embodiment described herein may be used to recognize other biometric indicia, such as facial features, pore prints or eye features.

FIG. 1 shows a block diagram of an embodiment of a fingerprint recognition system 10. Fingerprint recordation device acquires an image of the user's fingerprint. In conjunction with the acquired fingerprint image, information associated with the fingerprint image, such as the user's name and other data may be entered using input/output device 14 and stored to memory 18. A suitable fingerprint recordation device 12 must accept a user's thumb or finger, preferably in a generally predetermined orientation, and image the fingerprint. For example, an image array of the fingerprint pattern may be a 512×512 pixel three color image having an integer number defining intensity with a definition range for each color of 0–255, a gray scale image having values for pixels between 0–255 or may be a binary image, each pixel defined with a single bit. If image information is not in digitized form, a video image preprocessor module, such as an analog-to-digital converter 15, will digitize the image information.

Figure 2B:
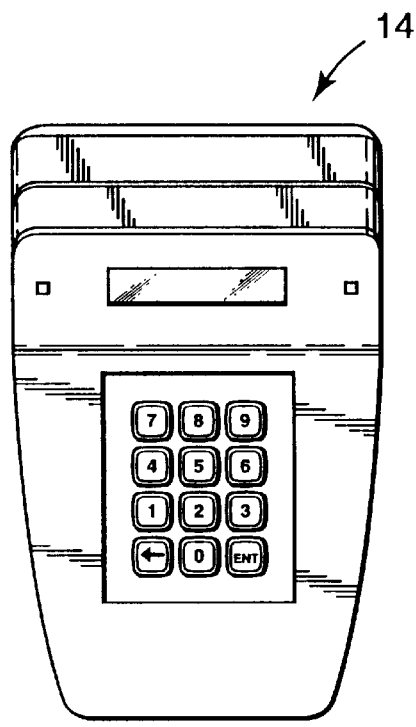

Many systems for recording fingerprints are well known in the art. For example, FIG. 2a and 2b show a semi-frontal view and a top plan view of a counter-mounted embodiment of the fingerprint recordation device 12 of the fingerprint recognition system 10 having an input/output device 14. Fingerprint recordation portion 12 has a thumb or finger positioning cavity 32, preferably with an indented platen, for receiving the thumb or finger comfortably and in a generally predetermined orientation. Finger positioning cavity 32 extends into the interior of the instrument providing access to detector window 30. The location and configuration of cavity 32 allows positioning of either the left or right hand of the individual seeking authentication. The configuration shown in FIG. 2a is only one of many that would allow for positioning of the hands to adequately acquire a fingerprint pattern. For example, detector window 30 could simply be a flat window integral in a counter or on a wall with placement guidelines thereon to ensure generally acceptable orientation.

Fingerprint recordation device 12 images an individual's fingerprint with a CCD camera when the individual places a thumb or finger on detector window 30. Many cameras suitable for use are commercially available, such as Model FC-11 Fingerprint Capture Station, from Digital Biometrics, of Minnetonka, Minn. When the Digital Biometrics camera is used, then frame grabber IP-8 Image Processing Board commercially available from Matrox Electronic Systems, LTD, of Dorual, Quebec, Canada is also used. Alternatively, for framgrabbing, information processing and display, Model GPB1 from Sharp Electronics, Irvine Calif., could be used in conduction with Fingerprint Imager DFR-90 from Identicator, of San Bruno, Calif. which is a direct fingerprint reader with a CCD camera therein and which outputs a standard RS-170 video signal.

Creation of Master Pattern Set

To create a master pattern set of an authorized user's fingerprint, processor 16 processes the digitized fingerprint image information according to the flow diagram illustrated in FIG. 3. So that the acquired fingerprint image can be analyzed in detail, each fingerprint image acquired at block 51 is divided into a plurality of regions of interest.

In a preferred embodiment, the regions of interest are overlapping, although the regions of interest may also be adjacent to each other. Each region of interest thus contains the information regarding a certain portion of the total fingerprint image. For purposes of the present invention, the regions of interest are referred to as "features". It shall be understood therefore, that the terms "feature" and "regions of interest" may be used interchangeably for purposes of the present invention. However, for clarity and ease of understanding, the term "feature" shall be used throughout the detailed description.

Figure 4:
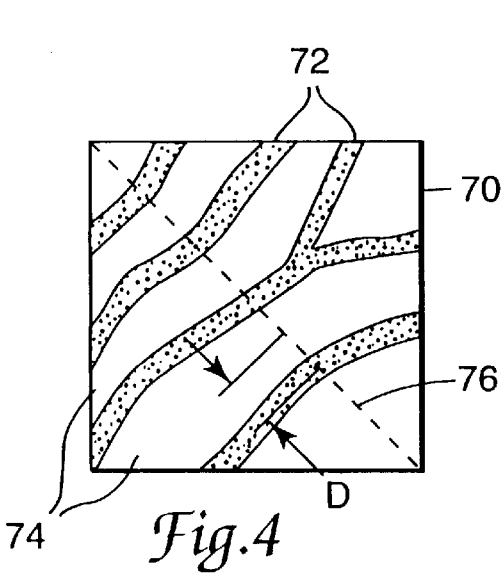
FIG. 4 shows a region of interest having a feature from a fingerprint pattern therein.

The feature size is defined at block 52. To determine the feature size, elastic deformations and distortions of the fingerprint pattern due to the elasticity of skin which can potentially cause recognition of an unauthorized user or failure to recognize the authorized user must be considered. With respect to elasticity, the feature size must be defined such that a ridge in the fingerprint pattern will not move into a gap in the pattern. FIG. 4 shows feature 70 of a fingerprint pattern having ridges 72 and gaps 74 between ridges 72. In the present invention, the size of feature 70 is selected such that ridge 72 will not deform due to elasticity into an area where gap 74 should be present. If feature 70 is too large, a smaller number of pixels will represent the width of ridges 72 and gaps 74, thereby allowing a deformation of ridge 72 onto a gap 74. Further, the size of the feature is selected such that the elasticity of skin will not deform to a point where a ridge can stretch outside the boundaries of the feature.

To ensure that ridges 72 do not deform into areas were gaps 74 should be present, the maximum deformation measured in number of pixels must be significantly less than the number of pixels from the center of a ridge to the center of an adjacent gap measured across a diagonal of the feature. Referring to FIG. 4, distance D represents the distance between the center of ridge 72 and gap 74 across diagonal 76. Thus, the feature size is chosen such that the maximum deformation measured in number of pixels will be significantly less than distance D. The size of a feature in number of pixels will vary, depending on the hardware chosen to implement the system, particularly with respect to the magnification of the optics. In a typical hardware implementation, where the resolution of the entire image is 256×256 pixels, a preferred feature size will have the dimensions of between 20–25 pixels square. Such a feature will typically contain approximately three to four ridges therein.

Figure 5:
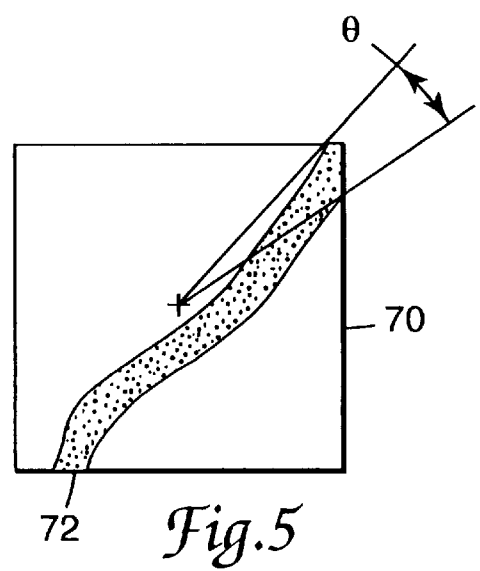
FIG. 5 is used to explain rotation of a fingerprint pattern.

Another factor that can be considered when determining feature size is the possibility of rotation when the fingerprint is presented. If the user rotates when presenting the fingerprint, ridges of the fingerprint pattern may rotate into areas where gaps should be present, thereby causing problems with subsequent matching. In FIG. 5, angle θ is defined by where the edges of ridge 72 intersect the boundaries of the feature 70. As mentioned above, the hardware, based on ergonomics, can control how the user presents the fingerprint on the platen. Even with this control, however, the recorded fingerprint image will inevitably contain some amount of rotation. The size of feature 70 is preferably chosen such that angle θ is significantly more than the angle that a user typically rotates. The smaller the feature size, the less problem with rotation.

Referring again to FIG. 3, after a feature size has been determined at block 52, the n most unique features within the fingerprint image are identified at block 54. The system of the present invention identifies a predetermined number of unique features in the fingerprint. The features are preferably local as opposed to global structures. These "unique" features are then arranged with respect to each other in patterns, the pattern defining a global structure. These patterns are what is stored as the master pattern set.

The features that are selected as being unique enough to characterize the fingerprint pattern could be selected in a number of different manners. For example, the processor could compare features that originated from the same fingerprint pattern using a correlation function to determine the uniqueness of a feature with respect to other features within the same fingerprint. Alternatively, the processor could compare features with respect to features from a plurality of fingerprints, thereby determining the probability of a feature existing in any fingerprint.

Figure 6:
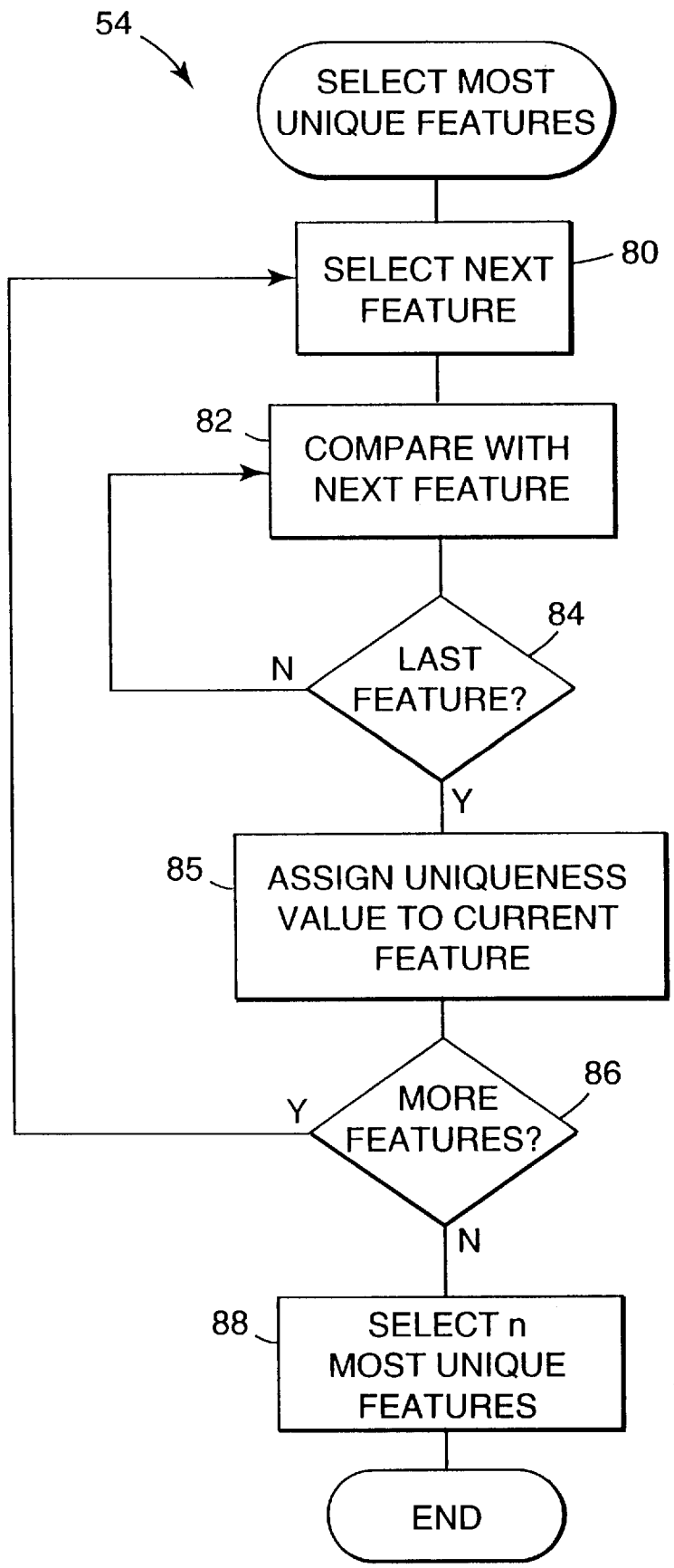
FIG. 6 is a flow diagram of a method for selecting the n most unique regions of interest.

A preferred method of determining the n most unique features within a single fingerprint is shown in FIG. 6. At block 80, a feature is selected for determination of the feature's uniqueness within the fingerprint from which it was taken. At blocks 82 and 84, the selected feature is compared with all other features in the image. From this comparison, each feature is assigned a uniqueness value at block 85. The feature comparison at block 82 preferably requires both uniqueness with respect to other features in the fingerprint and variance within the candidate feature. Uniqueness of a feature is the inverse of good correlation using a correlation function. A more unique feature will have a poor match or fit with other features in the same fingerprint. Variance within a feature requires that there is variance among the pixel values within the feature. For example, a feature having all black pixels or all gray pixels has little or no variance. Variance within a feature is desirable, as it can eliminate some features that have low correlation values but are not unique features.

In the preferred embodiment of the present invention, the system uses Equation 1 to determine the uniqueness, U, of each feature, R, within the image.

$$U(R) \equiv \max_{s} \left\{ 1 - \frac{\sum_{i,j} (R_{ij} - \overline{R})(I_{ij} - \overline{I})}{\sum_{i,j} (R_{ij} - \overline{R})^2 \sqrt{\sum_{i,j} (I_{ij} - \overline{I})^2}} \middle| I \epsilon S \right\} \quad \text{Equation 1}$$

In Equation 1, S is the set of all m-by-m features in the image, with the exception of R, which is the reference feature. $R_{ij}$ is the (i, j)th pixel gray level in feature R. Similarly, $I_{ij}$ is the (i, j)th pixel gray level in I. $\overline{R}$ and $\overline{I}$ are the mean gray levels within the respective features. The metric shown in Equation 1 requires both uniqueness of the feature within the image as well as variance within the feature.

After a uniqueness value has been determined for each feature, the system selects the n most unique features at block 88. The features with the n highest uniqueness values can be, but are not necessarily chosen when selecting the n most unique features. For example, in embodiments where the features overlap to a high degree, such as spaced by one pixel, several overlapping features which contain a very unique part of the fingerprint will have a high uniqueness value. In such a case, it is preferable to choose the feature with the highest uniqueness value in an area. After a feature has been selected, features occupying some area around the selected feature could be eliminated as candidates to be chosen as a unique feature. In another example, when selecting the n most unique features, the image may be analyzed in increments, such as in steps of one-third or one-half a feature, thereby ensuring that two selected features will overlap by at most one-third or one-half a feature size, respectively. Yet another embodiment can compare uniqueness values in an area and choose the feature with the maximum uniqueness value to represent that area.

The number of features chosen, n, may vary depending on a number of factors. The number of features chosen, n, must be a large enough number such that the system is not too dependent on a particular individual feature when matching the live fingerprint pattern with the stored master pattern. If a pattern is too dependent on a single feature and not enough other features are used to define the pattern, then if a user presents a live fingerprint pattern with the feature translated off the image, then it can affect the accuracy of the match. On the other hand, if too many features are chosen to define a pattern, then many features that are chosen might not provide significant data, because they are not that unique. When too many features are chosen, it further requires additional computation time from processor 16, which is undesirable if the additional features do not provide significant information. In a preferred embodiment, between four and twelve features are chosen to define a pattern. The number chosen depends on a number of factors, such as the speed of the processor or the resolution of the camera.

Referring again to FIG. 3, after the n most unique features are chosen, patterns based on these n features are determined at block 56. In the preferred embodiment, a "pattern" is defined as a collection of p features along with orientation data describing the location relationship between those features, as will later be described. If n features are selected as the number of unique features that can define a fingerprint pattern, and p features in each pattern, then there are $$\frac{n!}{p!(n-p)!}$$

Figure 7:
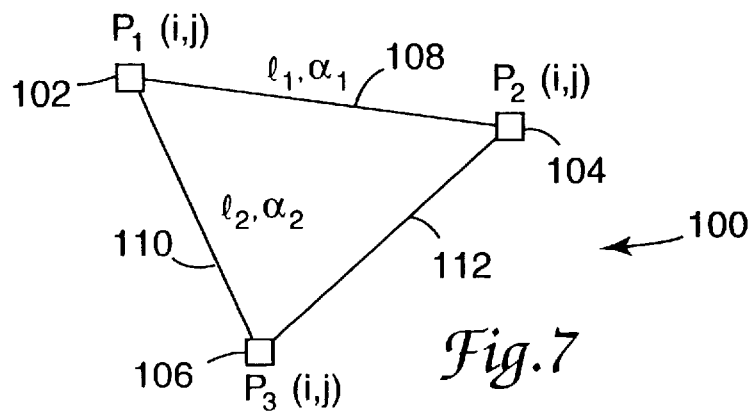
FIG. 7 is used to show two ways a three feature pattern may be defined.
Figure 8:
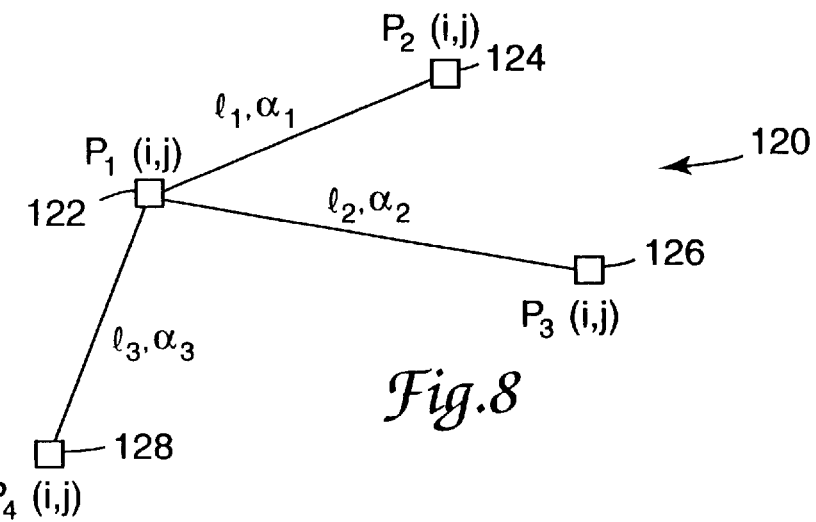
FIG. 8 is used to show how a four feature pattern may be defined.

FIGS. 7 and 8 are used to describe how the system takes the chosen features to define patterns at block 56. If six unique features are chosen (n=6) and three features are used to define each pattern (p=3), then twenty patterns, based on the different potential combination of the six features, $$\left(\text{number of patterns} = \frac{6!}{3!(6-3)!} = 20\right)$$

will define the master pattern set.

FIG. 7 shows how each pattern may be defined. A pattern is defined by a plurality of features and orientation data describing the location relationship of the features. A preferred format for defining a pattern is as a collection of p features along with the line lengths between each pair of features and the slopes of these lines. Pattern 100 is defined by three features (p=3) $P_1$, 102, $P_2$, 104, and $P_3$, 106, each defined by pixel location pairs (i, j). One of the three features is designated as the reference feature. In FIG. 7, feature $P_1$ 102 is designated as the reference feature. To define the pattern, the line length between the reference feature and the other two features is determined. In FIG. 7, length $l_1$ 108 is the length between $P_1$ 102 and $P_2$ 104 and length $l_1$ 110 is the length between $P_1$ 102 and $P_3$ 106. Pattern 100 is also defined by the slopes of lines 108 and 110, which are calculated by the angle of the lines relative to an arbitrary, predetermined reference. In FIG. 7, slopes $\alpha_1$ and $\alpha_2$ define the orientation of lines 108 and 110, respectively, with respect to a predetermined reference, such as a horizontal or vertical reference line. Thus, the reference feature, the line lengths between features and the line lengths'slopes can define the pattern. As will later be described, authentication will require that a live fingerprint pattern has both features that match the selected master features and that the features are oriented in the same pattern as the master pattern.

One desirable property of a pattern is rotational invariance, meaning that if the live fingerprint is rotated with respect to the orientation of the master pattern image, the system can still match two similar patterns. Although the embodiment shown in FIG. 7 is not rotationally invariant, it is rotationally tolerant because applying a correlation function still results in a high value for matching features as long as the rotation is significantly less than the angle θ, as defined in FIG. 5. One method of compensating for rotated live fingerprint patterns is storing patterns rotated in small increments, such as one degree or five degree increments, such that the most a user could realistically present a rotated live fingerprint pattern, based on the hardware, would be covered by the stored rotated patterns. In another embodiment, the pattern may be defined by three lengths rather than two lengths and two angles. For example, in FIG. 7, in addition to $I_1$ and $I_2$, a third line length 112, the length between $P_2$ and $P_3$, could define pattern 100. Defining pattern 100 in such a manner ensures that pattern 100 is rotationally invariant.

FIG. 8 shows how patterns may be defined if four features (p=4) are used to define each pattern. Pattern 120 has four features, $P_1, P_2, P_3$ and $P_4$ defined by regions of interest 122, 124, 126 and 128, respectively. Each feature is defined by pixel location pairs (i, j), with feature $P_1$ designated as the reference feature. With four features, three line lengths $l_1, l_2$, and $l_3$, representing the lengths between $P_1$ and $P_2$, $P_1$ and $P_3$ and $P_1$ and $P_4$, respectively, and three angles, $\alpha_1, \alpha_2$, and $\alpha_3$, corresponding with line lengths $l_1, l_2$, and $l_3$, define patterns 120. The length/angle format for storing patterns is preferred over other formats, such as length only, as it is easier to generalize with an arbitrarily large number of features in a pattern. It shall be understood however, that other means of representing orientation could be used without departing from the scope of the present invention. The format for storing the pattern preferably is not performed by storing pixel pair locations, as any translation of the live fingerprint would destroy any possible matching of all four feature locations. Expected locations of pixel pair locations, however, may be stored by the system for subsequent searching to expedite the matching process. Also, it is preferable to exclude features near the border of the image, as such features could be lost if the user translated the feature off the image acquiring device.

Referring again to FIG. 3, after the patterns are defined for a master pattern set, they are stored in memory at block 58.

Thus, the system does not store the actual fingerprint image; rather, the patterns determined at block 56 and the features therein are stored as the master pattern set. For example, in an embodiment with six features and three features per pattern, pointers to the six features and the twenty patterns are stored in memory. After block 58, the user is registered with the system.

It shall be noted that the above-described system allows the system itself to determine which features, or regions, of the fingerprint image are the most unique. These most unique features contain the most useful identifying information and are therefore the most useful for creation of the master pattern set. By allowing the system of the present invention to determine which features are most unique or useful, the present system is more reliable than existing "minutae-based" systems which are restricted to certain predefined fingerprint features such as forks, dead ends, whorls, etc. In these types of systems, the features found and used by the system may not actually be the best identifying features. These initial feature decisions are then propagated through the system, resulting in a higher degree of false identifications or false rejects. By allowing the system of the present invention to decide for itself which features are the most unique, the system maintains the advantages of minutae based systems while increasing the reliability of the final result.

Authentication

The second phase of the present invention provides authentication of a user's biometric indicia. This requires that the system find a match between a presented live biometric indicia and one of the recorded master pattern sets of an authorized user. As mentioned above, the present invention will be described wherein the biometric indicia is a fingerprint.

Figure 9:
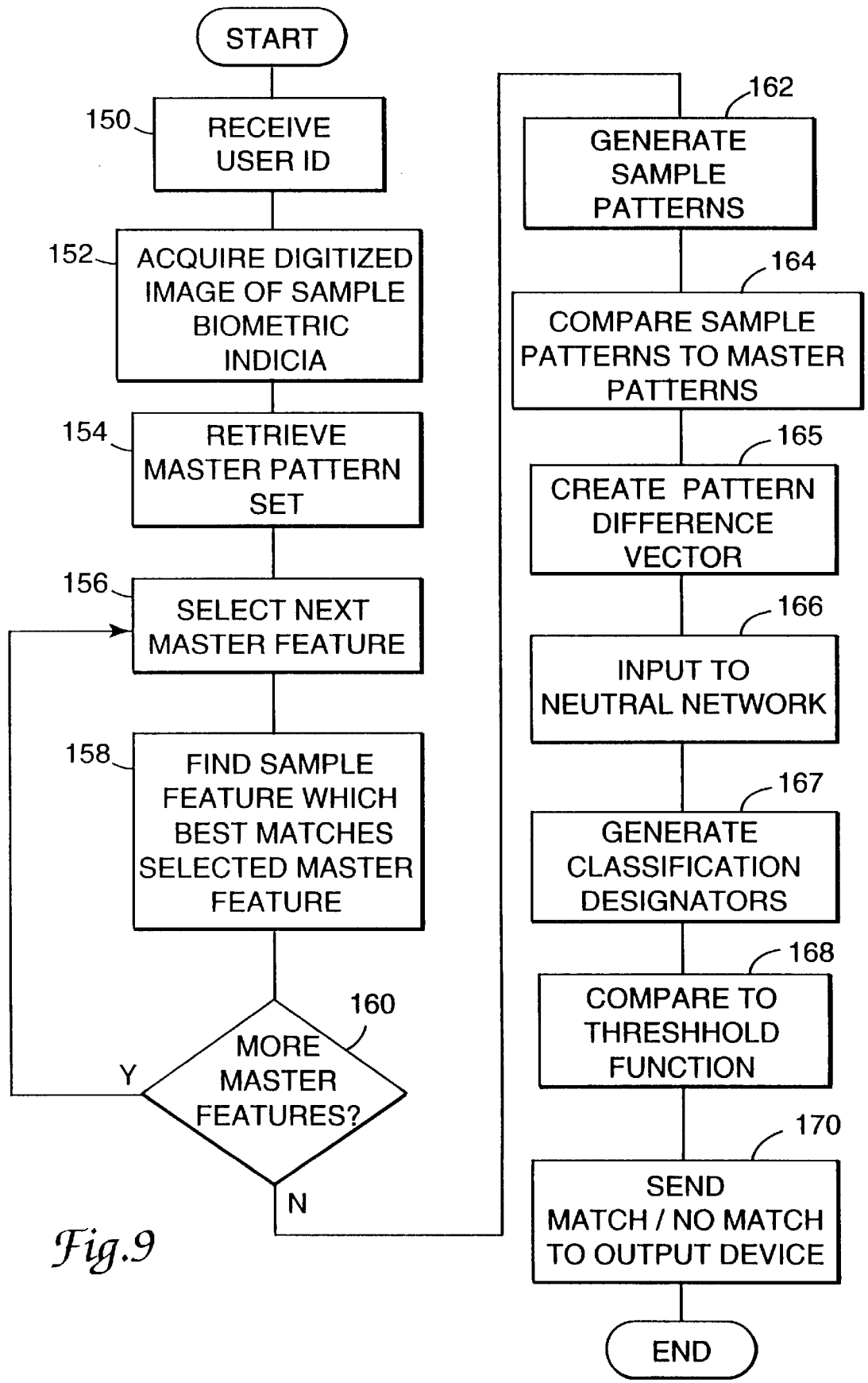
FIG. 9 is a flow diagram of a method for authenticating a user's biometric feature.

FIG. 9 shows a flow diagram of a preferred method of authenticating a presented live fingerprint with a recorded master pattern image stored in the format described above. When providing authentication of a user's fingerprint, the system preferably receives user identification information at block 150. This identification information can be, for example, a personal identification number (PIN), an id card or any other type of identification information. When the user id number is received, processor 16 retrieves the master pattern set corresponding to that user id information. Requiring the user to enter a PIN number is preferred, as it expedites the authentication process by providing information such as expected locations of features. In another embodiment, the system could check each master pattern set stored in the system until a match is found, in which case the user would be authenticated, or, if no match is found, the user would not be authenticated.

At block 152, the system acquires an image of the user to be authenticated biometric indicia, herein referred to as the sample image. At blocks 156, 158 and 160, processor 16 identifies the feature in the sample image that best matches each feature in the master pattern set. For example, in an embodiment where six features are used to define the master pattern set, the best match will be determined for each of the six features. At block 158, a feature from the master pattern set is compared with some or all of the features from the sample image. The features in the sample image with which the master feature is compared may be overlapping regions, spaced by only one pixel, or may be spaced in increments of a plurality of pixels. In an embodiment where an expected location is provided, the master feature can be compared with features within a subimage surrounding the expected location, such as a 40-by-40 or 80-by-80 pixel subimage. In another embodiment, the features can be taken from the entire image.

To determine the similarity of the master feature and the sample feature, any of a number of well known functions may be employed. In the preferred embodiment, the following standard correlation expression is used:

$$\frac{\sum_{i,j}(R_{ij}-\overline{R})(I_{ij}-\overline{I})}{\sum_{i,j}(R_{ij}-\overline{R})^2\sqrt{\sum_{i,j}(I_{ij}-\overline{I})^2}} \quad |I \in S$$

where S is the set of all m-by-m features in the image or subimage. R is a feature from the master pattern image and is compared with each candidate feature, I, from the sample image. $R_{ij}$ is the (i, j)th pixel gray level in master feature R. Similarly, $I_{ij}$ is the (i, j)th pixel gray level in sample feature I. $\overline{R}$ and $\overline{I}$ are the mean gray levels within the respective features. Each sample feature, I, is in the search region S which is centered over the expected location of the feature. The expected location is the coordinate values of R in embodiments where an expected location is used.

After finding the features in the sample image which best match each feature in the master pattern set, this set of matched sample features are used to generate a set of corresponding sample patterns at block 162. The master pattern set and the sample pattern set are then compared at block 164. The simplest method of pattern comparison is subtracting the line lengths and angles from the corresponding patterns from one another and using the correlation values, producing pattern difference vectors. For example, in an embodiment where each pattern consisted of three features, such a comparison would yield a seven dimensional difference function that defines the pattern difference:

Pattern difference =(3 correlation values, 2Δl values, 2 Δαvalues). The Δl values are the difference in the corresponding line lengths and the Δα values are the difference in the corresponding slope values. Alternatively, Δl could be calculated as the ratio of $l_1$ and $l_2$ rather than the difference, and a similar calculation could be used for Δα. The correlation values were determined in block 158 when the system searched for the sample features which best matched the master features. In such a pattern difference, better matching fingerprint patterns will have larger correlation values, indicating that features are similar, and small Δl and Δα values, indicating that the patterns are similar.

Each pattern difference vector generated at block 165 is then transmitted from processor 16 to neural network 20 to perform classification at block 166. Classification neural network 20, shown in FIG. 1, is trained on a set of pattern difference vectors, some which are known to match and some which are known not to match. Neural network 20 classifies each of the received patterns as matching or not matching, producing classification designators indicating the classification and transmits the information back to processor 16. A preferred classification neural network is described in commonly-assigned U.S. patent application Ser. No. 08/163,825 to Brady et al., filed Dec. 8, 1993 and entitled "Facet Classification Neural Network", which is incorporated by reference herein.

After processor 16 receives the classification designators from neural network 20, processor 16 determines whether the sample pattern image matches the master pattern image. At block 168 of FIG. 9, processor 16 sums the number of classification designators indicating that patterns matched. This sum may be compared with a threshold value, θ, and if the number of matching patterns exceed the threshold value, processor 16 determines that the fingerprints match.

Figure 10:
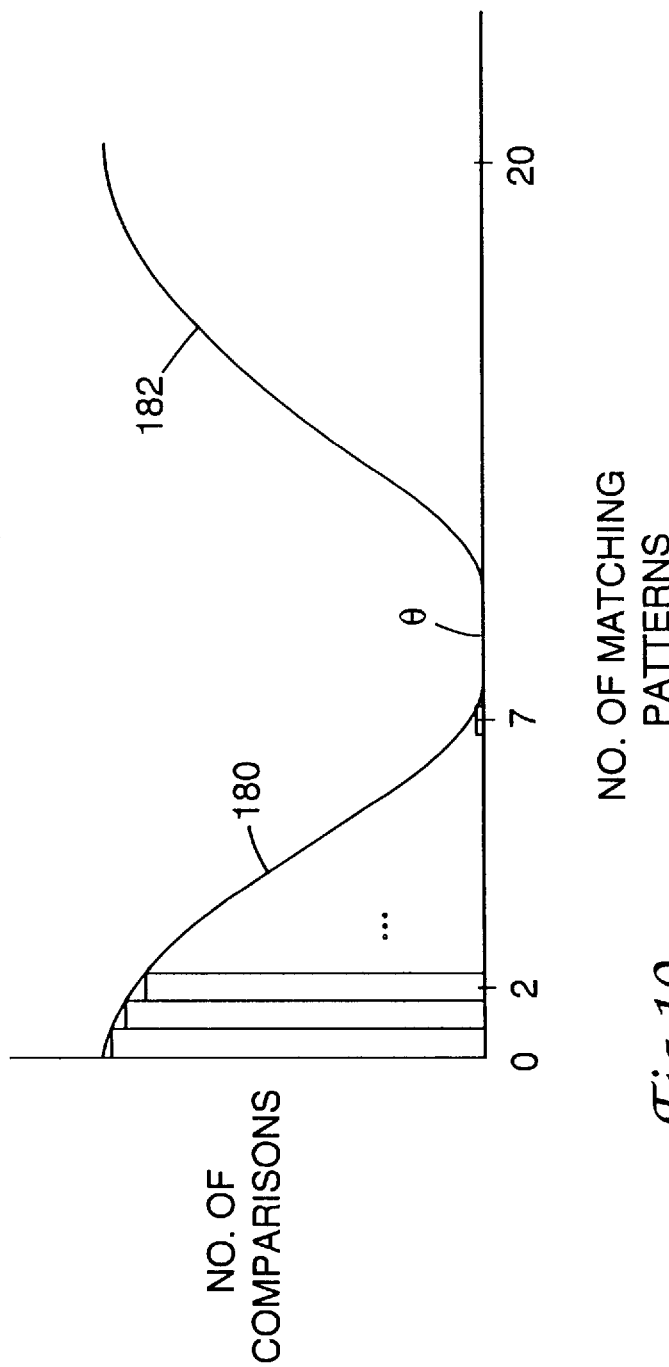
FIG. 10 is an example of a frequency density function used to define a threshold.
Figure 11:
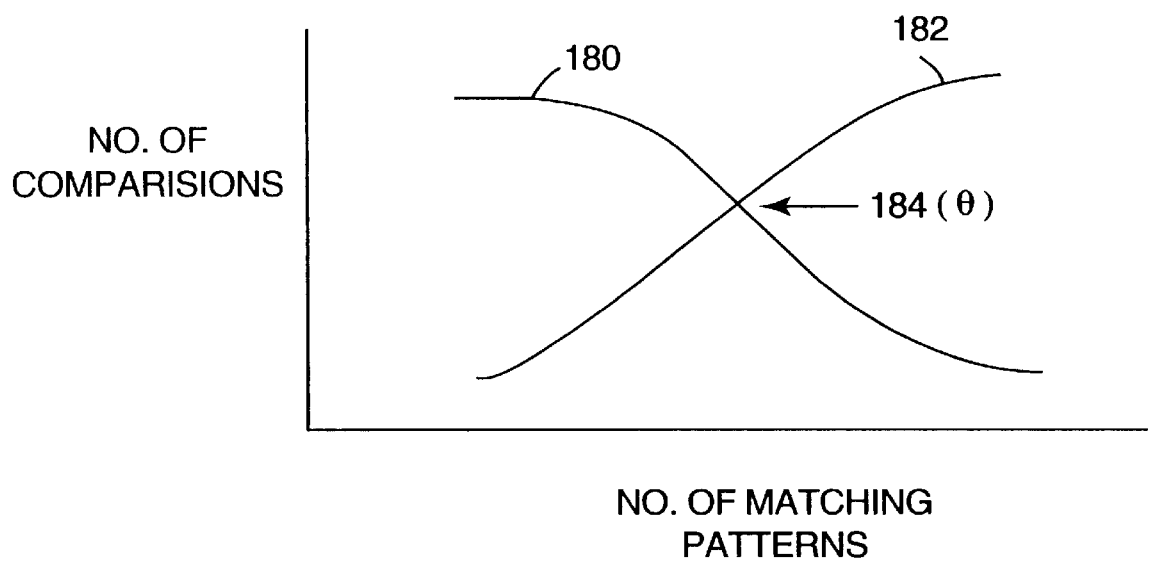
FIG. 11 shows another example of a frequency density function.

Rather than using a threshold value, processor 16 could set the threshold based on frequency density functions. FIG. 10 shows an example of frequency density functions 180 and 182 that processor 16 could use to set the threshold. Frequency density function 180 represents invalid comparisons while frequency density function 182 represents valid comparisons. On the x-axis is the number of matching patterns and on the y-axis is the number of comparisons. Frequency density functions 180 and 182 are a pair of histograms based on examples, indicated in FIG. 10 by the discrete values at each number on the x-axis. A continuous function can be fit to the discrete values, as shown in FIGS. 10 and 11. Threshold value θ is located where frequency density function 180 and 182 intersect, preferably where they are both at a minimum. The threshold value indicates the minimum number of patterns that must match for processor 16 to judge a match. Zero (0) matching patterns means that there is no match. In FIG. 10, from one to seven matching patterns are also deemed that there is no match, although there is some error in the examples. When more than 0 patterns match, then processor 16 determines that the fingerprint patterns match and sends a match signal to input/output device 14 at block 170.

FIG. 11 shows another pair of histograms having crossover point 184 which do not intersect on the x-axis. In such a case, false authentications or false rejections may occur. Depending upon the application, the threshold value may be moved up or down the x-axis. For example, in a high security application where false authentications are not acceptable, a higher threshold value would be used, potentially causing some false rejects.

The present invention has now been described with reference to several embodiments thereof It will be apparent to those skilled in the art that many changes or additions can be made in the embodiments described without departing from the scope of the present invention. Thus, the scope of the present invention should not be limited to the structures described in this application, but only by structures described by the language of the claims and the equivalents of those structures.

What is claimed is:

1. A biometric recognition system for authenticating biometric indicia of a user, the system comprising:

data storage means for storing a plurality of master pattern sets, each master pattern set corresponding one of a plurality of authorized users, each of the master pattern sets defined by a plurality of master features and master orientation data of the plurality of master features;

vector generation means for producing a comparison vector representing the level of similarity between a master pattern set and the biometric indicia; and a neural network for producing classification designators based on the comparison vector, wherein the classification designators are indicative of whether the user's biometric indicia should be authenticated;

wherein the vector generation means comprises:

identification means for identifying sample features in the biometric indicia that best match each of the master features;

pattern generation means for generating sample orientation data based on the sample features that best match each of the master features; and means for comparing the master orientation data and the sample orientation data to produce comparison orientation data;

wherein the comparison vector is based on the comparison orientation data and is also based on the similarity of the master features and their corresponding sample features; and the master pattern sets are derived using the following equation:

$$U(R) \equiv \max_{s} \left\{ 1 / \frac{\sum_{i,j}(R_{ij}-\overline{R})(I_{ij}-\overline{I})}{\sum_{i,j}(R_{ij}-\overline{R})^2 \sqrt{\sum_{i,j}(I_{ij}-\overline{I})^2}} \Big| I \in S \right\}$$

where S is the set of all m-by-m features in an image, with the exception of R, which is a reference feature; $R_{ij}$ is an (i, j)th pixel gray level in feature R; $I_{ij}$ s an (i, j)th pixel gray level in I; and $\overline{R}$ and $\overline{I}$ are mean gray levels within the respective features.

2. The biometric recognition system according to claim 1, wherein the identification means uses a correlation function to determine the similarity of the master features and their corresponding sample features; wherein the correlation function is $$\frac{\sum_{i,j}(R_{ij}-\vec{R})(I_{ij}-\vec{I})}{\sqrt{\sum_{i,j}(R_{ij}-\vec{R})^2}\sqrt{\sum_{i,j}(I_{ij}-\vec{I})^2}} \Big| I \in S$$

where S is the set of all m-by-m features in the image or subimage; wherein R is a feature from the master pattern image and is compared with each candidate feature, I, from the sample image; $R_{ij}$ is the (i, j)th pixel gray level in master feature R and $I_{ij}$ is the (i, j)th pixel gray level in sample feature I and $\overline{R}$ and $\overline{I}$ are the mean gray levels within the respective features.

3. The biometric recognition system according to claim 1, wherein the master orientation data and the sample orientation data include line lengths between the master features and between the sample features and slope data of the line lengths.

4. The biometric recognition system according to claim 3, wherein the comparison orientation data is produced by taking the difference between line lengths of the master features and corresponding line lengths of the sample features and between corresponding slope data of the corresponding line lengths.

5. The biometric recognition system according to claim 4, wherein the comparison orientation data is produced by taking a ratio between line lengths of the master features and corresponding line lengths of the sample features and a difference between corresponding slope data of the corresponding line lengths.

6. The biometric recognition system according to claim 1, further comprising biometric pattern acquisition means for acquiring an image of the biometric indicia and creating therefrom a sample image.

7. The biometric recognition system according to claim 6, wherein the data storage means further stores data relating to the biometric indicia.

8. The biometric recognition system according to claim 7, wherein the data includes expected locations of the master features in the sample image.

9. The biometric recognition system according to claim 8, wherein the identification means searches the expected locations of the sample image when identifying sample features that best match each of the master features using the equation of claim 1.

10. The biometric recognition system according to claim 1, wherein the vector generation means produces a plurality of comparison vectors, the system further comprising threshold means for receiving classification designators from the neural network, summing the number of classification designators indicating a match to produce a sum and comparing the sum with a threshold value to output a match signal when the sum exceeds the threshold value.

11. The biometric recognition system according to claim 10, wherein the threshold value is based on frequency density functions.

12. The biometric recognition system according to claim 1, further comprising interface means for providing an interface with the user.

13. A method for generating a master pattern set of a biometric indicia of a user, comprising the steps of:
(a) acquiring an image of the biometric indicia to produce a biometric pattern image, wherein the biometric pattern image includes a plurality of features;
(b) comparing each feature in the biometric pattern image with all other features in the biometric pattern image;
(c) assigning a uniqueness value to each feature in the biometric pattern image based on the results of comparing step (b);
(d) choosing, based on the uniqueness values, from the features in the biometric pattern image a plurality of master features;
(e) defining master patterns based on the master features;
(f) storing the master patterns and master features as the master pattern set, wherein assigning step (c) uses the following equation:

$$U(R) = \max_{s} \left\{ 1/ \frac{\sum_{i,j}(R_{ij} - \overline{R})(I_{ij} - \overline{I})}{\sum_{i,j}(R_{ij} - \overline{R})^2 \sqrt{\sum_{i,j}(I_{ij} - \overline{I})^2}} \; \middle| I \in S \right\}$$

where S is the set of all m-by-m features in an image, with the exception of R, which is a reference feature; $R_{ij}$ is an (i, j)th pixel gray in feature R; $I_{ij}$ is an (i, j)th pixel gray level in I; and $\overline{R}$ and $\overline{I}$ are mean gray levels within the respective features.

14. The method according to claim 13, wherein the master patterns are defined based on the master features and on orientation data describing location relationships between the master features using the equation of claim 13.

15. The method according to claim 14, wherein the orientation data includes line lengths between the plurality of master features and slope data of the line lengths.

16. The method according to claim 13 wherein the uniqueness value for a feature is defined based on the uniqueness of the feature with respect to the other features and on variance within the feature.

17. The method according to claim 13 wherein the master features are chosen based on the uniqueness values and is also based on which features have the highest uniqueness values in an area of the biometric pattern image.

18. A method for authenticating a biometric pattern of a user, in which authorized biometric patterns are stored and represented by corresponding master pattern sets comprised of a plurality of master patterns based on a plurality of master features in the corresponding biometric pattern, comprising the steps of:
(a) acquiring an image of a biometric pattern to be authenticated and producing therefrom a sample pattern image, wherein the sample pattern image includes a plurality of sample features;
(b) retrieving a master pattern set;
(c) comparing each master feature in the retrieved master pattern set with the sample features and determining therefrom which sample feature best matches each master feature, and producing therefrom a set of matched sample features;
(d) defining sample patterns based on the set of matched sample features;
(e) comparing the sample patterns with the master patterns;
(f) authenticating the sample pattern image upon a favorable comparison step (e), wherein comparing step (c) uses the following equation:

$$U(R) = \max_{s} \left\{ 1/ \frac{\sum_{i,j}(R_{ij} - \overline{R})(I_{ij} - \overline{I})}{\sum_{i,j}(R_{ij} - \overline{R})^2 \sqrt{\sum_{i,j}(I_{ij} - \overline{I})^2}} \; \middle| I \in S \right\}$$

where S is the set of all m-by-m features in an image, with the exception of R, which is a reference feature; $R_{ij}$ is an (i, j)th pixel gray level in feature R; $I_{ij}$ is an (i, j)th pixel gray level in I: and $\overline{R}$ and $\overline{I}$ are mean gray levels within the respective features.

19. The method according to claim 18 wherein comparing step (e) further comprises the steps of:
(e1) comparing the sample patterns with the master patterns to generate pattern difference vectors;
(e2) analyzing the pattern difference vectors and producing therefrom classification designators indicative of whether the sample and master patterns match;
(e3) determining that the sample patterns match the master pattern set if the classification designators exceed a threshold.

20. The method according to claim 19 wherein a neural network analyzes the pattern difference vectors.

21. The method according to claim 18 further including the step of receiving user identification information.

22. The method according to claim 21 wherein the master pattern set retrieved in step (b) is chosen based on the user identification information.

23. A method for authenticating a biometric pattern of a user, comprising the steps of:
storing a master pattern set from the user, the master pattern set defined by a plurality of master features and master orientation data of the plurality of master features;
acquiring a sample biometric pattern of a user to be authenticated;
identifying sample features in the sample biometric pattern that best match each of the plurality of master features;
generating sample orientation data based on a pattern generated by the identified sample features;
comparing the master orientation data and the sample orientation data to produce comparison orientation data;
producing a comparison vector based on the similarity of the plurality of master features and their corresponding identified sample features and based on the comparison orientation data;
producing classification designators based on the comparison vector; and
authenticating the biometric pattern if the classification designators indicate a match, wherein the comparing step uses the following equation:

$$U(R) \equiv \max_{S} \left\{ 1 / \frac{\sum_{i,j}(R_{ij}-\overline{R})(I_{ij}-\overline{I})}{\sum_{i,j}(R_{ij}-\overline{R})^2 \sqrt{\sum_{i,j}(I_{ij}-\overline{I})^2}} \Big| I \in S \right\}$$

where S is the set of all m-by-m features in an image, with the exception of R, which is a reference feature; $R_{ij}$ an (i, j)th pixel gray level in feature R; $I_{ij}$ is an (i, j)th pixel gray level in I; and $\overline{R}$ and $\overline{I}$ are mean gray levels within the respective features.

\* \* \* \* \*

UNITED STATES PATENT AND TRADEMARK OFFICE
CERTIFICATE OF CORRECTION

PATENT NO.: 5,892,838

DATED: April 6, 1999

INVENTOR(S): Mark J. Brady

It is certified that error appears in the above-identified patent and that said Letters Patent is hereby corrected as shown below:

Col. 12, lines 20-25 (claim 2), kindly delete the formula depicted and replace it with --

$$\frac{\sum_{i,j}(R_{ij}-\overline{R})(I_{ij}-\overline{I})}{\sqrt{\sum_{i,j}(R_{ij}-\overline{R})^2}\sqrt{\sum_{i,j}(I_{ij}-\overline{I})^2}} \mid I \in S$$

--

Signed and Sealed this

Thirtieth Day of May, 2000

Q. TODD DICKINSON

Attest:

Attesting Officer

Director of Patents and Trademarks